United States Patent
Yamamoto (10) Patent No.: US 12,403,600 B2
(45) Date of Patent: Sep. 2, 2025

(54) MOTION DATA GENERATING SYSTEM FOR ROBOT, MOTION DATA GENERATING METHOD FOR ROBOT, AND STORAGE MEDIUM

(71) Applicant: TOYOTA JIDOSHA KABUSHIKI KAISHA, Toyota (JP)

(72) Inventor: Kazuya Yamamoto, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/129,232

(22) Filed: Mar. 31, 2023

(65) Prior Publication Data
US 2023/0373090 A1      Nov. 23, 2023

(30) Foreign Application Priority Data

May 18, 2022   (JP) .................................. 2022-081584

(51) Int. Cl.
*G05B 19/00*      (2006.01)
*B25J 5/00*       (2006.01)
(Continued)

(52) U.S. Cl.
CPC ............. *B25J 9/1664* (2013.01); *B25J 5/00* (2013.01); *G05B 19/4155* (2013.01); *G05B 2219/40523* (2013.01)

(58) Field of Classification Search
CPC ....... B25J 9/1664; B25J 5/00; G05B 19/4155; G05B 2219/40523; G05B 2219/45083; B62D 57/032
See application file for complete search history.

(56) References Cited

U.S. PATENT DOCUMENTS

| | | | |
|---|---|---|---|
| 2005/0021176 A1* | 1/2005 | Takenaka | B62D 57/032 700/245 |
| 2006/0139355 A1* | 6/2006 | Tak | G06T 13/40 345/473 |

(Continued)

FOREIGN PATENT DOCUMENTS

| | | | |
|---|---|---|---|
| JP | 2006-116672 A | | 5/2006 |
| JP | 2008036761 A | * | 2/2008 |

(Continued)

OTHER PUBLICATIONS

Translation of JP-2008036761-A. Miyagawa et al. Movement Data Creation Device and Method Therefor. Feb. 21, 2008. (Year: 2008).*

(Continued)

*Primary Examiner* — Khoi H Tran
*Assistant Examiner* — Tien Minh Le
(74) *Attorney, Agent, or Firm* — Dinsmore & Shohl LLP (57) ABSTRACT

A motion data generating system for a robot including a waist and a leg, comprising: a test subject motion data acquiring unit that acquires captured waist motion data from motion of a leg separated from motion of a test subject; a representative point extracting unit that performs peak detection by smoothing the captured leg motion data; a scale converting unit that converts the capture leg motion data and the capture waist motion data at a representative point into a scale of the robot; a ZMP setting unit that sets a target zero moment point (ZMP of the robot; an interpolation generating unit that generates an attitude of the leg and the waist of the robot by interpolation; and a motion data generating unit that generates motion data in which the attitude of the leg and the waist is corrected so as to satisfy a target ZMP.

5 Claims, 6 Drawing Sheets

(51) Int. Cl.
 *B25J 9/16* (2006.01)
 *G05B 19/4155* (2006.01)

(56) References Cited

U.S. PATENT DOCUMENTS

2011/0301756 A1* 12/2011 Yoshiike .............. B62D 57/032
 901/1
2022/0305640 A1 9/2022 Yamamoto

FOREIGN PATENT DOCUMENTS

JP 2012-223864 A 11/2012
JP 2022-149702 A 10/2022

OTHER PUBLICATIONS

Kanako Miura et al, "Turn Motion of a Humanoid Robot HRP-4C Exploiting MoCap Data", [No. 09-4] Proceedings of the 2009 JSME Conference on Robotics and Mechatronics, Fukuoka, Japan, May 24-26, 2009.

* cited by examiner

MOTION DATA GENERATING SYSTEM FOR ROBOT, MOTION DATA GENERATING METHOD FOR ROBOT, AND STORAGE MEDIUM

CROSS-REFERENCE TO RELATED APPLICATION

This application claims priority to Japanese Patent Application No. 2022-081584 filed on May 18, 2022, incorporated herein by reference in its entirety.

BACKGROUND

1. Technical Field

The present disclosure relates to a motion data generating system for a robot, a motion data generating method for a robot, and a storage medium.

2. Description of Related Art

Two-leg walking robots have been developed such that stable walking control is executed. Japanese Unexamined Patent Application Publication No. 2006-116672 (JP 2006-116672 A) discloses a walking control device that restrains movement of a leg such that walking is generated passively with respect to an external force. The walking control device drives each joint such that an angle formed by a straight line connecting the hip joint portion and the center of gravity of the swing leg with a vertical plane and an angular velocity thereof have a mirror image relationship with those of the support leg. Further, the walking control device adaptively tilts the posture of the upper body in accordance with the target walking speed.

SUMMARY

However, the gait of the robot that has been calculated and executed is different from the natural gait of a human. An object of the present disclosure is to provide a motion data generating system for a robot, a motion data generating method for a robot, and a storage medium that allow the robot to imitate the gait of a human or for reproducing a swing leg representation such dancing.

A motion data generating system for a robot is a motion data generating system for a robot provided with at least a waist and a leg, and includes: a test subject motion data acquiring unit acquires captured leg motion data captured from a motion of the separating leg of a test subject and captured waist motion data captured from a motion of the waist; a representative point extracting unit that smooths the captured leg motion data, performs peak detection, and extracts at least a separation starting point, a peak position, and a separation ending point as representative points; a scale converting unit that converts the captured leg motion data and the captured waist motion data at the representative point to a scale of the robot; a ZMP setting unit that sets up a target zero moment point (ZMP) of the robot at the representative point; an interpolation generating unit that generates postures of the leg and the waist of the robot for every step in accordance with a control cycle of the robot between the representative points by interpolation; and a motion data generating unit that generates motion data in which the postures of the leg and the waist of the robot for each step are modified so as to satisfy the target ZMP.

According to such a configuration, it is possible to provide a system for generating the motion data of a robot that imitates the gait of a human. Further, it is possible to provide a system for generating the motion data of a robot that can reproduce a swing leg representation such as a movement of raising one leg, for example, dancing.

Further, in the motion data generating system according to the present disclosure, as a preliminary motion, the postures of the leg and the waist after the separation starting point are generated so as to satisfy the target ZMP and added to the representative point of the interpolation generating unit, and as a preliminary motion, the postures of the leg and the waist before the separation ending point are generated so as to satisfy the target ZMP and added.

According to such a configuration, a stable gait of the robot can be obtained.

Further, in the motion data generating system according to the present disclosure, the robot includes an upper body, the test subject motion data acquiring unit acquires captured upper body motion data captured from a motion of an upper body of the test subject, the scale converting unit converts the captured upper body motion data of the test subject at the representative point to the scale of the robot, the interpolation generating unit generates a posture of the upper body of the robot for each step between the representative points by interpolation, and the motion data generating unit generates motion data in which the postures of the upper body, the leg, and the waist of the robot for each step are modified so as to satisfy the target ZMP.

According to such a configuration, the robot can imitate the gait of a human as the whole body including the upper body. In addition, the robot can reproduce a swing leg representation such as a movement of raising one leg, for example, dancing with the whole body including the upper body.

A motion data generating method for a robot according to the present disclosure is a motion data generating method for a robot provided with at least a waist and a leg, and includes: acquiring captured leg motion data captured from a motion of the separating leg of a test subject and captured waist motion data captured from a motion of the waist; smoothing the captured leg motion data, performing peak detection, and extracting at least a separation starting point, a peak position, and a separation ending point as representative points; converting the captured leg motion data and the captured waist motion data at the representative point to a scale of the robot; setting up a target zero moment point (ZMP) of the robot at the representative point; generating postures of the leg and the waist of the robot for every step in accordance with a control cycle of the robot between the representative points by interpolation; and generating motion data in which the postures of the leg and the waist of the robot for each step are modified so as to satisfy the target ZMP.

According to such a configuration, it is possible to generate the motion data of a robot that imitates the gait of a human. Further, it is possible to generate the motion data of a robot that can reproduce a swing leg representation such as a movement of raising one leg, for example, dancing.

A storage medium according to the present disclosure stores a motion data generating program for a robot that is a motion data generating program for a robot provided with at least a waist and a leg, and the motion data generating program executed by a computer operating as an arithmetic device includes: acquiring captured leg motion data captured from a motion of the separating leg of a test subject and captured waist motion data captured from a motion of the waist; smoothing the captured leg motion data, performing peak detection, and extracting at least a separation starting point, a peak position, and a separation ending point as representative points; converting the captured leg motion data and the captured waist motion data at the representative point to a scale of the robot; setting up a target zero moment point (ZMP) of the robot at the representative point; generating postures of the leg and the waist of the robot for every step in accordance with a control cycle of the robot between the representative points by interpolation; and generating motion data in which the postures of the leg and the waist of the robot for each step are modified so as to satisfy the target ZMP.

According to such a configuration, it is possible to provide a storage medium that stores a program for generating the motion data of a robot that imitates the gait of a human. Further, it is possible to provide a storage medium that stores a program for generating the motion data of a robot that can reproduce a swing leg representation such as a movement of raising one leg, for example, dancing.

According the present disclosure, it is possible to provide the motion data generating system for a robot that allows the robot to imitate the gait of a human. Further, according to the present disclosure, it is possible to provide the motion data generating system for a robot that can reproduce a swing leg representation such as a movement of raising one leg, for example, dancing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Hereinafter, embodiments of the present disclosure will be described with reference to the drawings. However, the disclosure according to the claims is not limited to the following embodiments. Moreover, all of the configurations described in the embodiments are not necessarily indispensable for solving the issue. In order to clarify the explanation, the following description and drawings have been omitted or simplified as appropriate. In each drawing, the same elements are designated by the same reference signs, and duplicate explanations are omitted as necessary.

Description of the Configuration of the Robot According to the Embodiment

Figure 1:
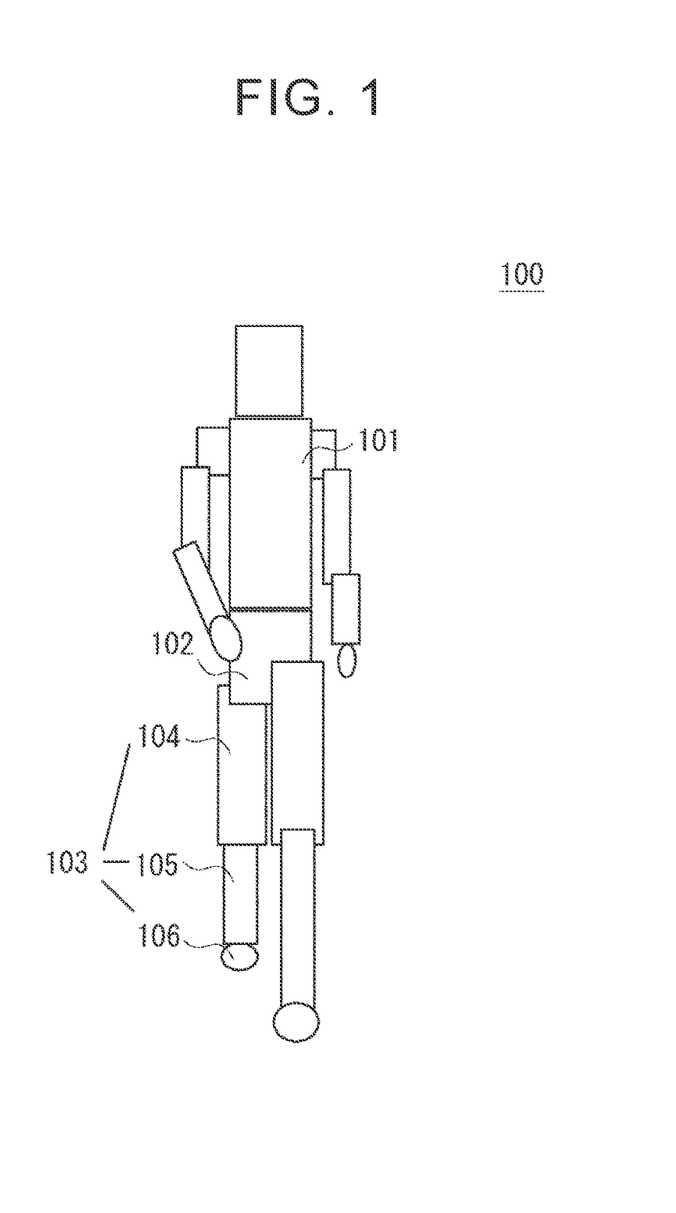
FIG. 1 is a schematic diagram illustrating a configuration example of a robot controlled by a motion data generating system for a robot according to an embodiment.

FIG. 1 is a schematic diagram illustrating a configuration example of a robot controlled by a motion data generating system for a robot according to an embodiment. A configuration of the robot according to the embodiment will be described with reference to FIG. 1.

As shown in FIG. 1, the robot 100 includes a lower body 103, a waist 102, and an upper body 101.

The lower body 103 according to the embodiment includes two legs like a person. The lower body 103 has a configuration corresponding to the upper leg 104, the lower leg 105, and the foot 106 of a person. Lower body 103 supports waist 102 and upper body 101. The waist 102 and the upper leg 104 are connected by a three-axis motor, the upper leg 104 and the lower leg 105 are connected by a one-axis motor, and the lower leg 105 and the foot 106 are connected by a two-axis motor. That is, the leg of the lower body 103 is driven by a multi-axis motor.

The waist 102 connects the lower body 103 and the upper body 101. The waist 102 performs, for example, a motion of changing the posture. The posture includes a three-dimensional position and rotation of the joint.

The upper body 101 may comprise a configuration corresponding to at least one of a person's head, neck, torso, arms, hands, and fingers, although the upper body 101 may not. The upper body 101 according to the present embodiment has a configuration corresponding to a human head, a neck, a torso, an arm, and a hand, respectively. A motion data generating system for a robot according to an embodiment will be described.

Figure 2:
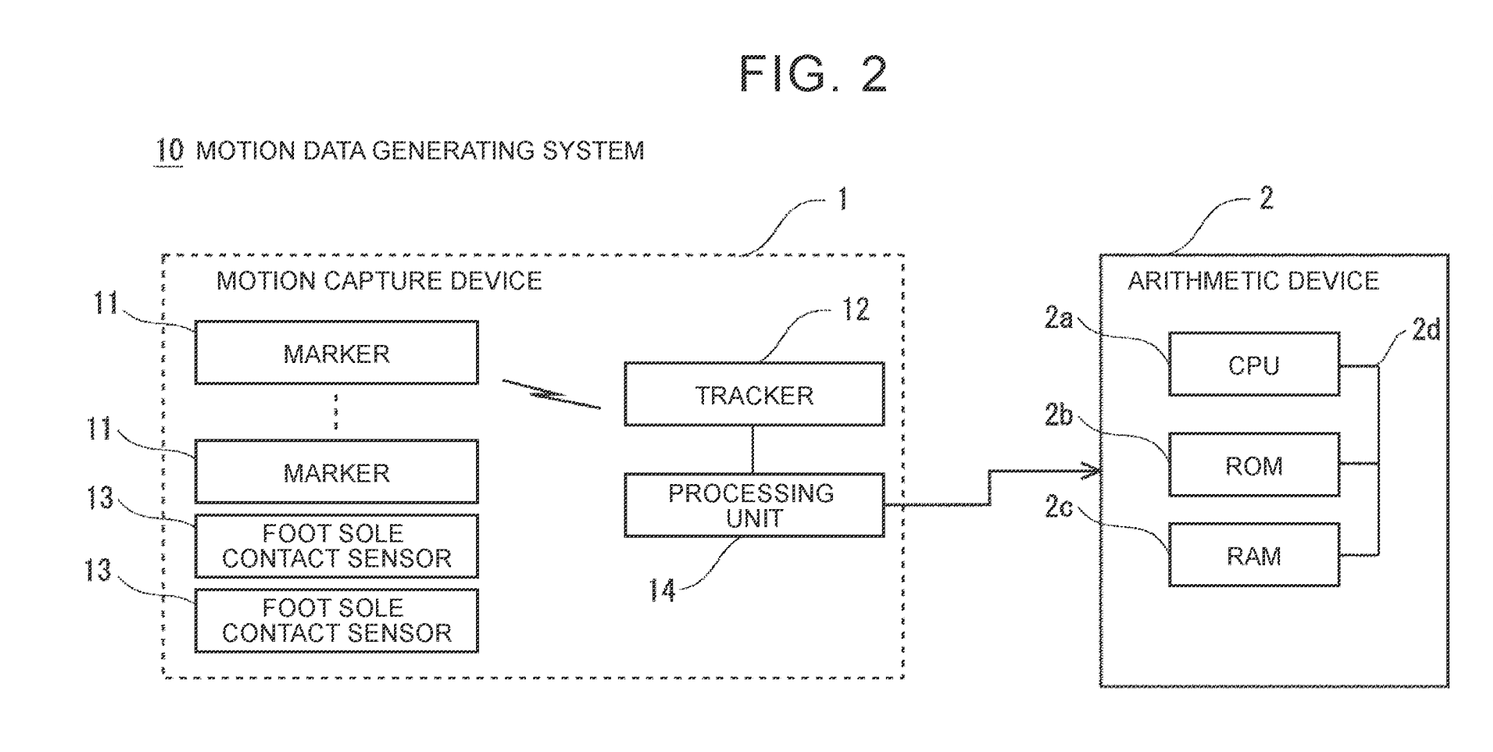
FIG. 2 is a diagram illustrating a schematic system configuration of a motion data generating system for the robot according to the embodiment.
Figure 3:
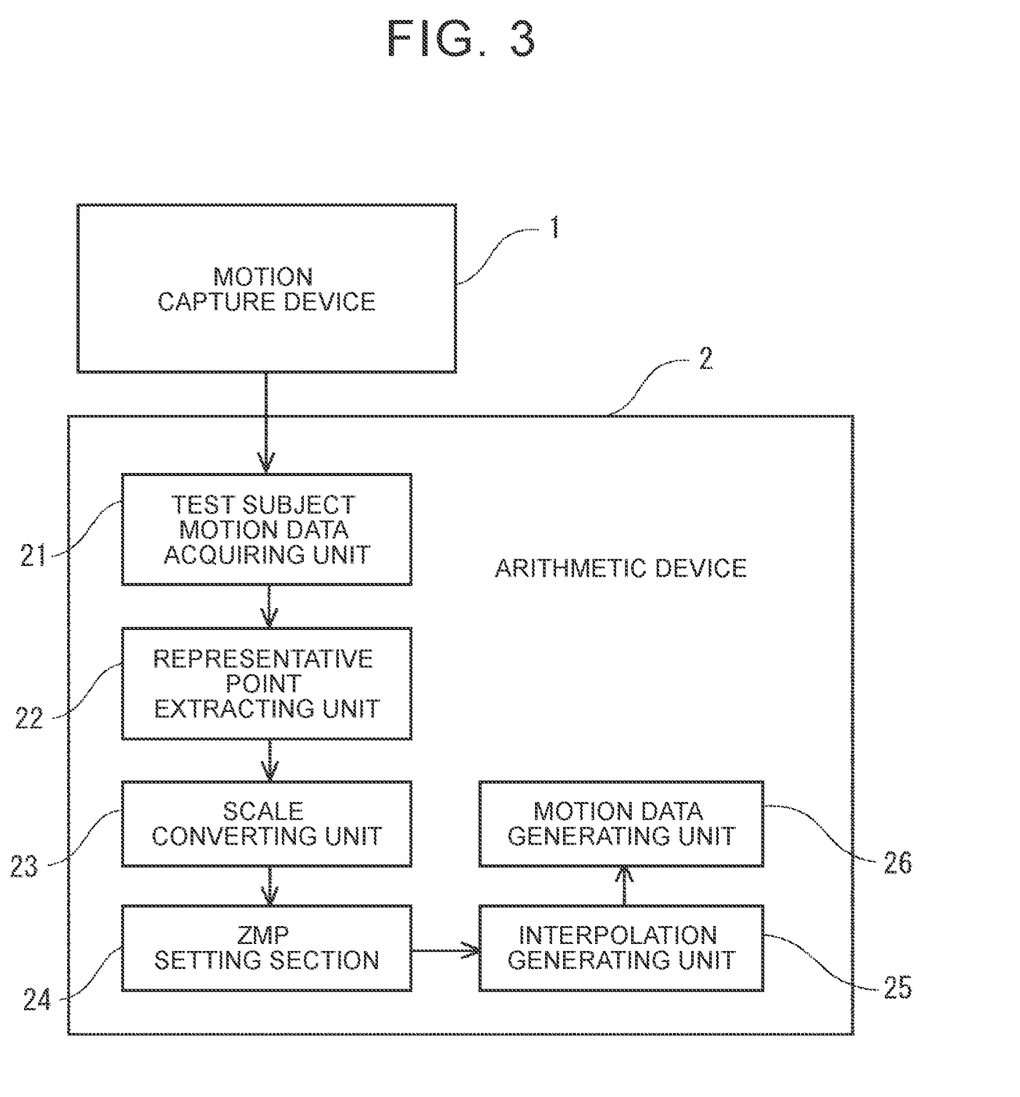
FIG. 3 is a block diagram illustrating a schematic system configuration of an arithmetic device of the motion data generating system for the robot according to the embodiment.

FIG. 2 is a diagram illustrating a schematic system configuration of a motion data generating system for the robot according to the embodiment. FIG. 3 is a block diagram illustrating a schematic system configuration of an arithmetic device of the motion data generating system for the robot according to the embodiment. With reference to FIGS. 2 and 3, the motion data generating system for the robot according to the embodiment will be described.

The motion data generating system 10 according to the present embodiment includes a motion capture device 1 and an arithmetic device 2. Motion capture device 1 acquires the motion data from the motion of the test subject. The arithmetic device 2 generates motion data of a humanoid robot such as a biped walking robot based on the motion data acquired by motion capture device 1. The motion data generating system 10 may generate motion data of a natural humanoid robot that is closer to the motion of the test subject.

Motion capture device 1 may be any device that acquires the joint positions of the lower body and the waist of the test subject. Motion capture device 1 may further acquire the joint angles of the lower body and the hip of the test subject. Motion capture device 1 may be a tracker, a sensor, a camera-image, or the like. Motion capture device 1 according to the present embodiment includes a plurality of markers 11, a tracker 12, a plurality of sole touch sensors 13, and a processing unit 14. The tracker 12 detects the position of each marker 11. The processing unit 14 processes a motion of each marker 11 detected by the tracker 12 and an output signal (floor reaction force information or the like) of the sole touch sensor 13.

Figure 4:
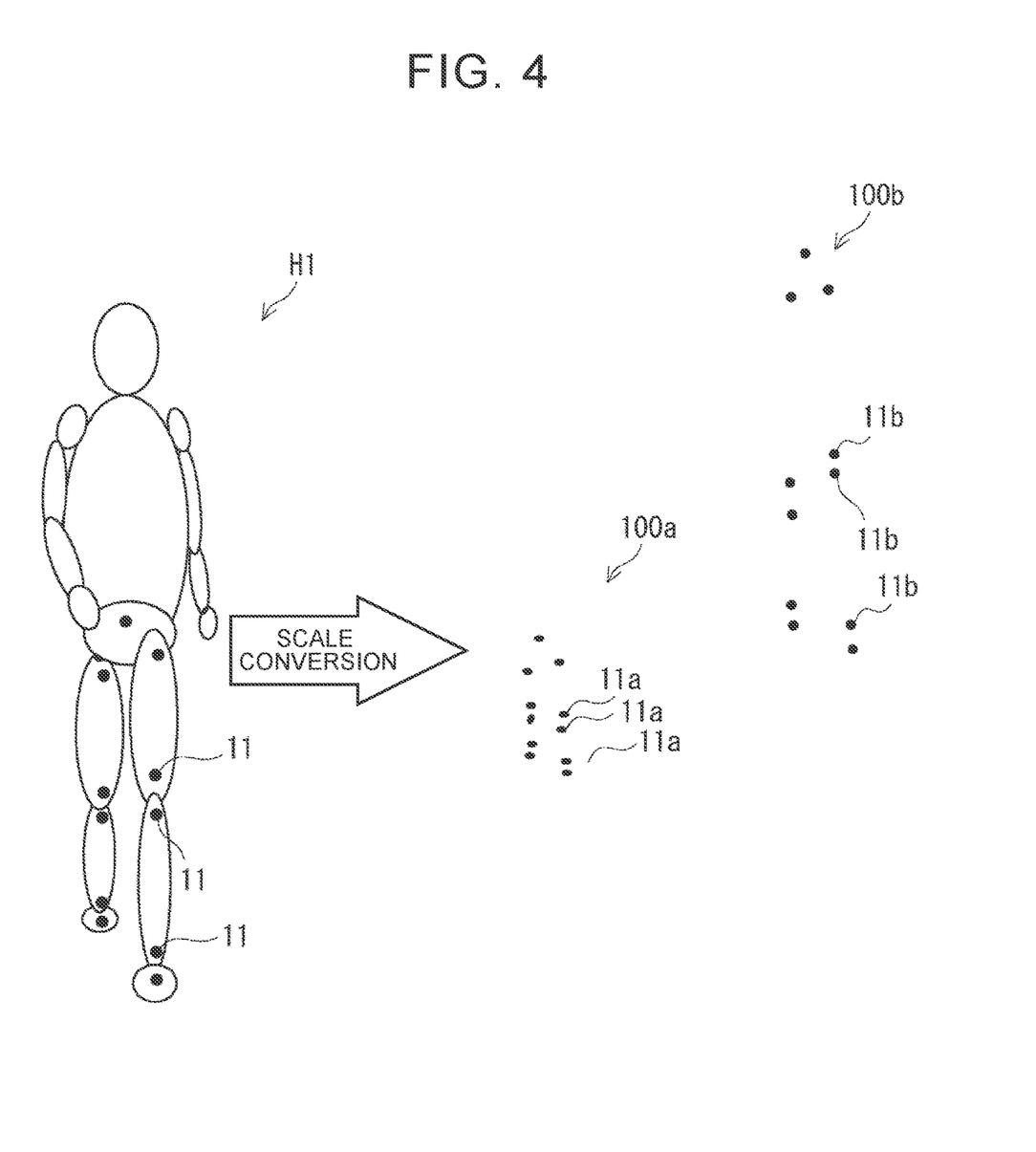
FIG. 4 is a diagram illustrating a scale conversion from a person to a robot according to the embodiment.

The markers 11 are respectively attached to a region of interest that measures (captures) the motion of the test subject H1 (see FIG. 4). The region of interest includes at least a lower body and a waist of the test subject H1, and is, for example, a waist, an upper leg, a lower leg, a foot, or the like. The tracker 12 detects the position of each marker 11 at a predetermined cycle. The position of each marker 11 detected by the tracker 12 is input to the processing unit 14. In this way, motion data of the target part of the test subject is acquired. The processing unit 14 performs predetermined processing on the detected position data of the marker 11. The processing unit 14 outputs the processed motion data (motion capture data) to the arithmetic device 2.

The arithmetic device 2 generates motion data of a natural humanoid robot closer to the motion of the test subject based on the motion data of the test subject. The arithmetic device 2 is hardware-configured mainly by a microcomputer having a Central Processing Unit (CPU) 2*a*, a Read Only Memory (ROM) 2*b*, and a Random Access Memory (RAM) 2*c*. CPU 2*a* performs, for example, an arithmetic process or the like. ROM 2*b* stores a motion program or the like executed by CPU 2*a*. RAM 2*c* temporarily stores processed data and the like. CPU 2*a*, ROM 2*b* and RAM 2*c* are connected to each other by a data bus 2*d*.

As illustrated in FIG. 3, the arithmetic device 2 according to the present embodiment includes a test subject motion data acquiring unit 21, a representative point extracting unit 22, a scale converting unit 23, a ZMP setting unit 24, an interpolation generating unit 25, and a motion data generating unit 26.

The test subject motion data acquiring unit 21 acquires the hip posture, the joint angle of the legs, and the forefoot posture of the person, which are the motion data of the test subject, from motion capture device 1. Here, the posture is the three-dimensional position and rotation of each joint. The test subject motion data acquiring unit 21 records the motion data of the test subject as time-series data. The acquired motion data includes captured leg motion data captured from the motion of the leg of the test subject H1 and captured waist motion data captured from the motion of the waist. At this time, motion capture device 1 or the arithmetic device 2 determines whether or not the legs are grounded. The determination may be analyzed from motion capture, but is more accurate as measured by the sole touch sensor 13.

The test subject motion data acquiring unit 21 may acquire the captured upper body motion data obtained by capturing the motion of the upper body. By acquiring the captured upper body motion data, the robot can simulate the gait of the whole body of the person and reproduce the playing leg representation of the whole body such as the dance of the robot. If the robot 100 does not have an upper body, the captured upper body motion data may not be acquired.

The arithmetic device 2 discriminates a section in which one leg is not grounded, that is, a separation leg, from the data of the test subject motion data acquiring unit 21. The representative point extracting unit 22 smooths the three-dimensional position of the leg in the time when one leg is not grounded, and performs peak detection. Further, the representative point extracting unit 22 extracts the detected peak position as a representative point. For example, the peak detection is individually performed with respect to the position of the three-dimensional coordinates of the foot tip in the x direction, the position of the foot tip in the y direction, and the position of the foot tip in the z direction. In some cases, for example, the angle r of the roll axis of the foot tip, the angle p of the pitch axis, and the angle y of the yaw axis are also individually performed. The representative point extracting unit 22 adds all the detected representative points, and then performs thinning on representative points having a plurality of time widths at intervals equal to or less than a predetermined interval. This decimation is performed by averaging the times at which adjacent representative points exist and combining the solutions so as to be representative points. Peak detection can adjust the detection threshold. Peak detection can reproduce human features with higher sensitivity. The representative point extracting unit 22 also extracts the separation starting point and the separation ending point as representative points.

The scale converting unit 23 is a specific example of a scaling unit. The scale converting unit 23 performs a well-known retargeting process on the motion data from motion capture device 1 in order to adapt the motion data of the test subject to the humanoid robot that actually operates. The motion data acquired by motion capture device 1 is a motion based on the length of each part of the test subject. Therefore, the scale converting unit 23 performs retargeting process because the position and orientation of the lower body and the waist to be used as the motion data and the position and orientation of any joint cannot be applied to the humanoid robot as it is.

For example, the scale converting unit 23 determines the magnification of each link of the humanoid robot from the ratio between each link length of the humanoid robot to be applied and the length of the corresponding portion of the test subject, and performs retargeting process.

FIG. 4 is a diagram illustrating an exemplary retargeting process of the positions of the respective markers 11 attached to the test subject H1. In FIG. 4, retargeting processed markers are shown as marker 11*a* for a robot 100*a* smaller than a human. For robot 100*b* larger than humans, retargeting processed markers are shown as marker 11*b*. The marker 11*a* in the motion data of the robot 100*a* move closer to each other. The marker 11*b* in the motion data of the robot 100*b* are spaced apart from each other as compared to those in the motion data of the robot 100*a*.

When the position of the leg and the waist is not achievable in the robot 100 due to insufficient range of motion of the robot 100, a difference in body size ratio, or the like in scaling, the scale converting unit 23 corrects the position of the foot or the waist to a range achievable in the vicinity. When the upper body of the robot 100 is present, the scale converting unit 23 also performs scale conversion on the captured upper body motion data.

ZMP setting unit 24 sets a target zero moment point (ZMP) of the robots 100 at the representative point. Zero moment point (ZMP) is a point where the combined force of the inertial force generated by the motion of the robot 100 and the gravitational force acting on the robot 100 intersects the floor surface. The target ZMP is basically set around the stance, but may be corrected in accordance with the robot 100.

ZMP setting unit 24 may create a preliminary motion after the separation starting point or immediately after the separation, so that the separation can be stably performed at the separation starting point, and may add the preliminary motion as a representative point. ZMP setting unit 24 generates, as a preliminary motion, the position of the foot immediately after the separation starting point. Further, ZMP setting unit 24 generates a preliminary motion by correcting the target ZMP. For example, ZMP setting unit 24 adds a motion of raising the legs to be released slightly upward. Similarly, ZMP setting unit 24 may create a preliminary motion before the separation ending point and immediately before the grounding so that the separation ending point can be stably grounded, and may add a representative point. For example, a motion of moving a foot directly above a surface to which a leg that is separated is grounded and then lowering the foot is added. In this way, a stable gait and swing leg representation of the robot can be obtained.

The interpolation generating unit 25 generates, by interpolation, the posture of the leg and the waist for each step in accordance with the control cycle of the robot 100 between all the representative points. The interpolation generating unit 25 places the target ZMP at a predetermined position of the stance. Interpolation is possible in a number of known ways, but is set so that the forefoot, the hip posture, and the respective joint angles are continuous in position and velocity. When the upper body is present in the robot 100, the interpolation generating unit 25 generates the posture of the upper body for each step by interpolation.

The motion data generating unit 26 corrects the posture so that the postures of the legs and the waist of the respective steps satisfy the target ZMP, and generates time-series data. The time-series data is converted into motion data such that the robot 100 does not fall over. When the robot 100 has an upper body, the motion data generating unit 26 corrects the posture so that the whole body posture of the upper body, the waist, and the legs of the respective steps satisfies the target ZMP, and generates time-series data.

The arithmetic device 2 may further include at least one of a data correction unit, a first inverse kinematics calculation unit, a target center-of-gravity trajectory calculation unit, and a second inverse kinematics calculation unit as appropriate. The data correcting unit performs correcting processing such as grounding of the foot, on the motion data retargeting processed by the scale converting unit 23. The first inverse kinematics calculation unit performs inverse kinematics calculation on the whole body of the humanoid robot on the basis of the motion data subjected to retargeting process and the correction process, and calculates each joint angle sequence (time series data of each joint angle) of the humanoid robot. Further, the first inverse kinematics calculation unit calculates ZMP trajectory, the center of gravity trajectory, the angular momentum trajectory of the center of gravity, and the like of the humanoid robot prior to the dynamical stabilization based on the calculated joint angle rows. The target center-of-gravity trajectory calculation unit is a specific example of the target center-of-gravity trajectory calculation unit, and calculates the target center-of-gravity trajectory based on ZMP trajectory calculated by the first inverse motion calculation unit and the target ZMP trajectory calculated by ZMP setting unit. The second inverse kinematics calculation unit is a specific example of the second inverse kinematics calculation unit, and performs inverse kinematics calculation on the entire body of the humanoid robot based on the target center-of-gravity trajectory calculated by the target center-of-gravity trajectory calculation unit, and calculates each joint angle row of the humanoid robot. Each joint angle row of the calculated humanoid robot can be used as a part of the motion data.

With the motion data obtained by the motion data generating system of the robot, the robot can simulate a gait of a person. In addition, the motion data obtained by the motion data generating system of the robot enables the robot to reproduce a swing leg representation such as a motion of one-foot lifting such as dance.

A description will be given of a method for generating motion data of a robot according to an embodiment.

Figure 5:
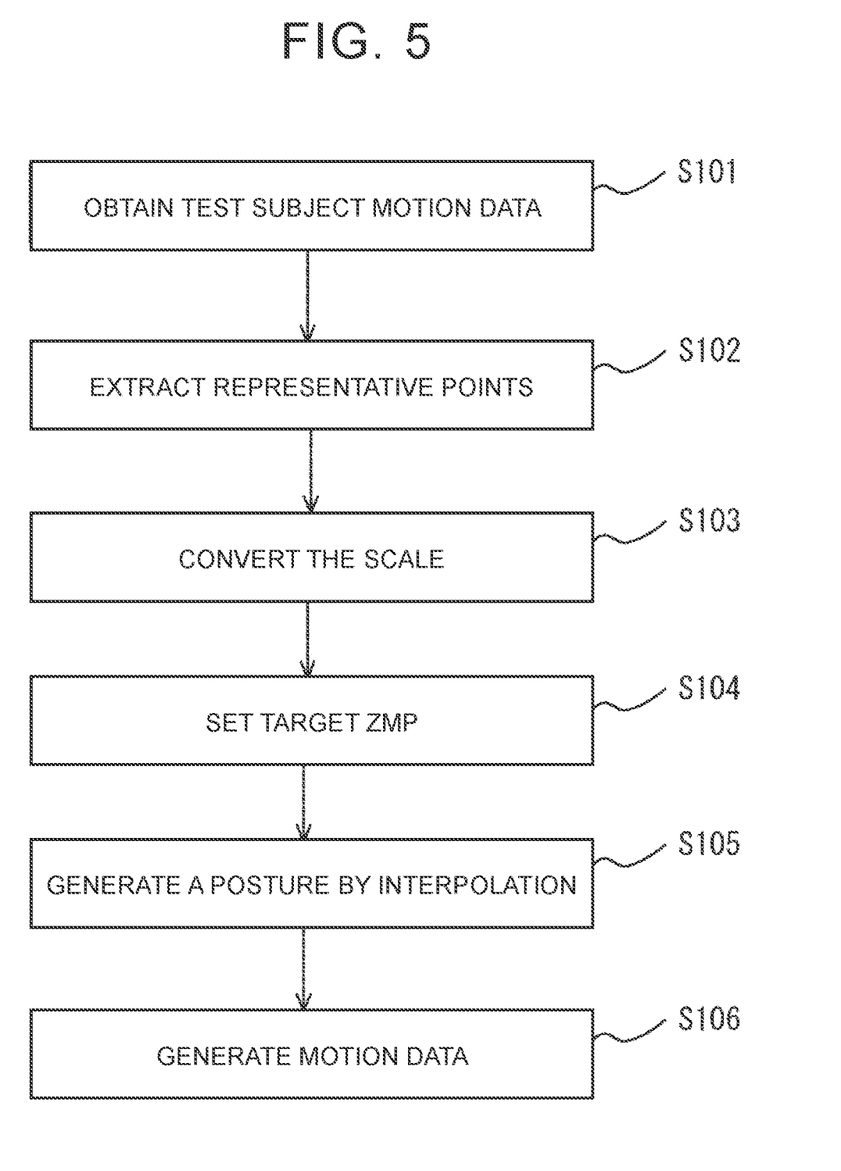
FIG. 5 is a flowchart illustrating an example of a motion of the motion data generating system for the robot according to the embodiment.
Figure 6:
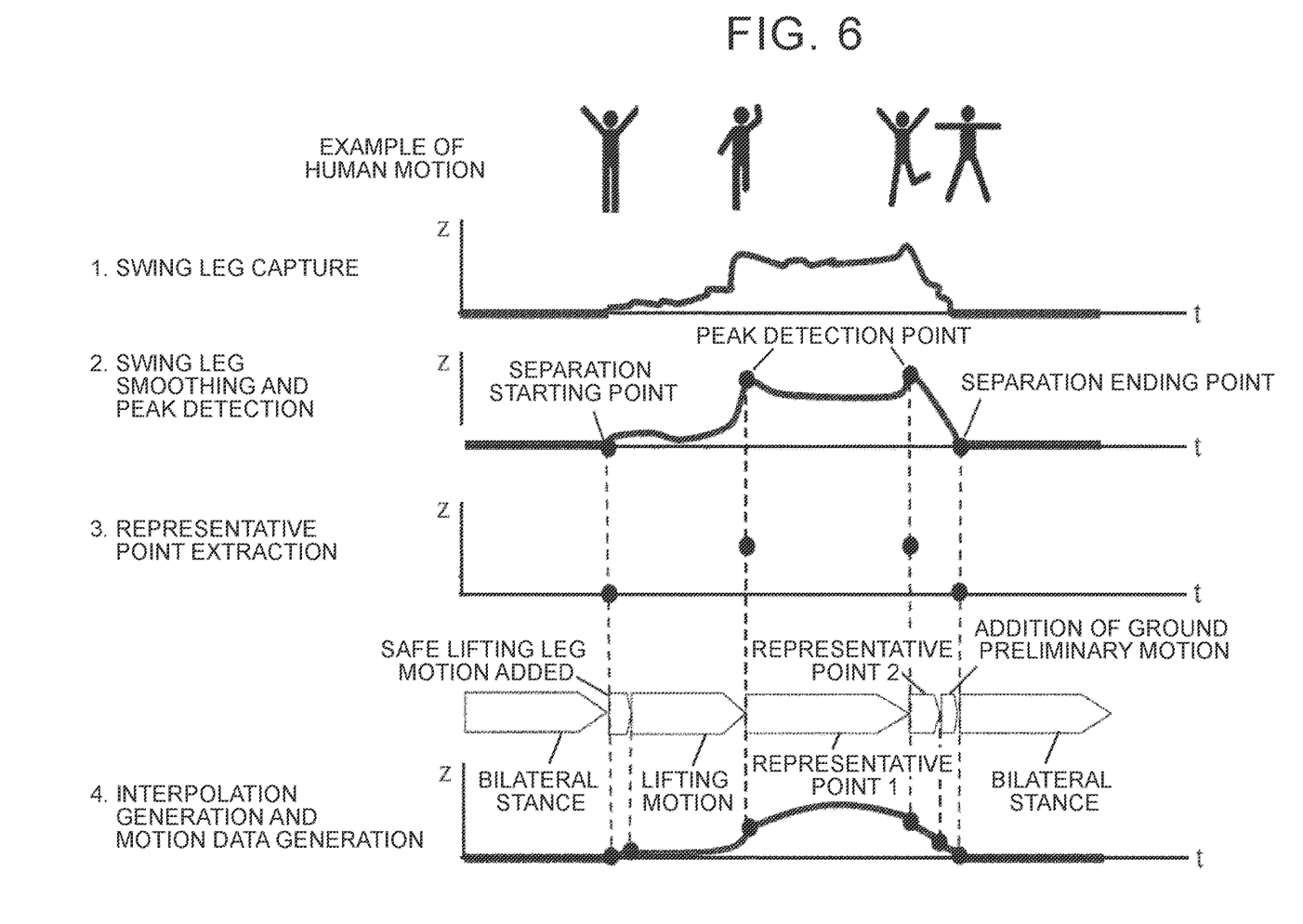
FIG. 6 is a diagram illustrating an example of idle leg data of the motion data generating system for the robot according to the embodiment.

FIG. 5 is a flowchart illustrating an example of a motion of the robot motion data generating system according to the embodiment. FIG. 6 is a diagram illustrating an example of idle leg data of the motion data generating system of the robot according to the embodiment. With reference to FIGS. 5 and 6, the motion data generating method of the robot according to the embodiment will be described.

From here, reference will be made to the data of the height (z-axis) of the swing leg. First, as shown in FIG. 5, the test subject motion data acquiring unit 21 performs steps (S101) of acquiring test subject data. As shown in FIG. 6, 1. data of the swing leg capture is acquired. The data of the swing leg capture is highly irregular with respect to the horizontal. Therefore, when the data of the swing leg capture is applied to the robot as it is, the motion is not stabilized, and therefore, the arithmetic device 2 performs smoothing and peak detection. When peak detection of the free leg capture data after smoothing is performed, 2. data of smoothing and peak detection of the free leg capture data shown in FIG. 6 is obtained. Next, the representative point extracting unit 22 performs steps (S102) of extracting the representative point shown in FIG. 5. When the representative point is extracted, the data of 3. extraction of the representative point shown in FIG. 6 is obtained. Thereafter, the scale converting unit 23 performs steps (S103) of converting the scale from the person to the robot illustrated in FIG. 5. ZMP setting unit 24 performs steps (S104) of setting the target ZMP. Here, the arithmetic device 2 may add a representative point of the preliminary motion for starting and ending the leaving. The interpolation generating unit 25 performs steps (S105) of generating an attitude by interpolation. The motion data generating unit 26 performs steps (S106) of generating the motion data. When interpolation and motion data are generated, 4. interpolation generation and motion data generation shown in FIG. 6 are obtained, and motion data of the robot is obtained. Here, the height direction (z-axis) of the leg is referred to, but the same steps are performed in the advancing direction (x-axis) and the width direction (y-axis) of the leg.

By such a step, it is possible to generate motion data of the robot that mimics the gait of a person. In addition, it is possible to generate motion data of a robot that can reproduce a swing leg representation such as a movement of one-foot lifting such as dance.

In addition, some or all of the processing in the arithmetic device 2 described above can be realized as a computer program. The program as described above is stored using various types of non-transitory computer-readable media, and can be supplied to a computer. The non-transitory computer-readable media include various types of tangible recording media. Exemplary non-transitory computer-readable media include magnetic recording media (e.g., flexible disks, magnetic tapes, hard disk drives), magneto-optical recording media (e.g., magneto-optical disks), CD Read Only Memory (CD-ROM), CD-R, CD-R/W, solid-state memories (e.g., masking ROM, Programmable ROM (PROM), Erasable PROM (EPROM), flash ROM, Random Access Memory (RAM). Further, the program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

By causing a computer that operates as an arithmetic device to execute such a motion data generating program, it is possible to create motion data of a robot that can mimic a gait of a person and reproduce a swing leg representation.

The present disclosure is not limited to the above embodiment, and can be appropriately modified without departing from the spirit.

What is claimed is:

1. A motion data generating system for a robot provided with at least a waist and a leg, the motion data generating system comprising:
 a central processing unit that:
 acquires captured leg motion data captured from a motion of the separating leg of a test subject and captured waist motion data captured from a motion of the waist;
 smooths the captured leg motion data, performs peak detection, and extracts at least a separation starting point, a peak position, and a separation ending point as representative points;
 converts the captured leg motion data and the captured waist motion data at the representative point to a scale of the robot;
 sets up a target zero moment point (ZMP) of the robot at the representative point;
 generates postures of the leg and the waist of the robot for every step in accordance with a control cycle of the robot between the representative points by interpolation;
 generates motion data in which the postures of the leg and the waist of the robot for each step are modified so as to satisfy the target ZMP;
 performs the peak detection individually with respect to a position of three-dimensional coordinates of a foot tip in a x-direction, in a y-direction, and in a z-direction, and also for an angle of a roll axis, an angle of a pitch axis, and an angle of a pitch axis; and
 adds all detected representative points, and performs thinning on the representative points that have a plurality of time widths at intervals equal to or less than a predetermined time interval.

2. The motion data generating system according to claim 1, wherein:
 as a first preliminary motion, the postures of the leg and the waist after the separation starting point are generated so as to satisfy the target ZMP and added to the representative point; and
 as a second preliminary motion, the postures of the leg and the waist before the separation ending point are generated so as to satisfy the target ZMP and added to the representative point.

3. The motion data generating system according claim 1, wherein:
 the robot includes an upper body; and
 the central processing unit:
 acquires captured upper body motion data captured from a motion of an upper body of the test subject;
 converts the captured upper body motion data of the test subject at the representative point to the scale of the robot;
 generates a posture of the upper body of the robot for each step between the representative points by interpolation; and
 generates motion data in which the postures of the upper body, the leg, and the waist of the robot for each step are modified so as to satisfy the target ZMP.

4. A motion data generating method for a robot provided with at least a waist and a leg, the method comprising:
 acquiring captured leg motion data captured from a motion of the separating leg of a test subject and captured waist motion data captured from a motion of the waist;
 smoothing the captured leg motion data, performing peak detection, and extracting at least a separation starting point, a peak position, and a separation ending point as representative points;
 converting the captured leg motion data and the captured waist motion data at the representative point to a scale of the robot;
 setting up a target zero moment point (ZMP) of the robot at the representative point;
 generating postures of the leg and the waist of the robot for every step in accordance with a control cycle of the robot between the representative points by interpolation;
 generating motion data in which the postures of the leg and the waist of the robot for each step are modified so as to satisfy the target ZMP;
 performing the peak detection individually with respect to a position of three-dimensional coordinates of a foot tip in a x-direction, in a y-direction, and in a z-direction, and also for an angle of a roll axis, an angle of a pitch axis, and an angle of a pitch axis; and
 adding all detected representative points, and performing thinning on the representative points that have a plurality of time widths at intervals equal to or less than a predetermined time interval.

5. A non-transitory storage medium storing a motion data generating program for a robot provided with at least a waist and a leg, the motion data generating program executed by a computer operating as an arithmetic device, comprising:
 acquiring captured leg motion data captured from a motion of the separating leg of a test subject and captured waist motion data captured from a motion of the waist;
 smoothing the captured leg motion data, performing peak detection, and extracting at least a separation starting point, a peak position, and a separation ending point as representative points;
 converting the captured leg motion data and the captured waist motion data at the representative point to a scale of the robot;
 setting up a target zero moment point (ZMP) of the robot at the representative point;
 generating postures of the leg and the waist of the robot for every step in accordance with a control cycle of the robot between the representative points by interpolation;
 generating motion data in which the postures of the leg and the waist of the robot for each step are modified so as to satisfy the target ZMP;
 performing the peak detection individually with respect to a position of three-dimensional coordinates of a foot tip in a x-direction, in a y-direction, and in a z-direction, and also for an angle of a roll axis, an angle of a pitch axis, and an angle of a pitch axis; and
 adding all detected representative points, and performing thinning on the representative points that have a plurality of time widths at intervals equal to or less than a predetermined time interval.

* * * * *